Snell & Bartlett.
Take-Up and Let-Off.
No. 489. Reissued Sept. 1, 1857.
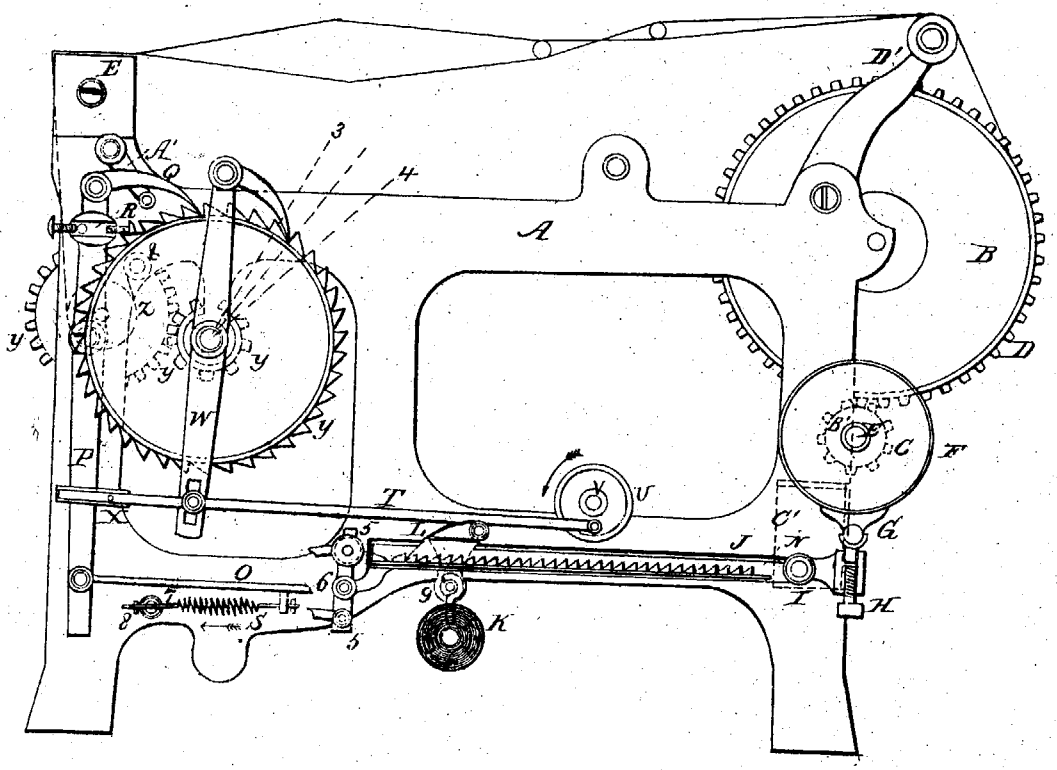

UNITED STATES PATENT OFFICE.

DANIEL W. SNELL AND STEPHEN S. BARTLETT, OF WOONSOCKET, R. I.

IMPROVEMENT IN LOOMS.

Specification forming part of Letters Patent No. 16,405, dated January 13, 1857; Reissue No. 489, dated September 1, 1857.

*To all whom it may concern:*

Be it known that we, DANIEL W. SNELL and STEPHEN S. BARTLETT, of Woonsocket, in the town of Cumberland, in the county of Providence, State of Rhode Island, have invented a new and Improved Mechanism in Looms for Weaving Cloth; and we do hereby declare that the following is a full and exact description thereof, reference being had to the accompanying drawings, and to the letters of reference marked thereon.

Our invention is what would be termed in mechanical parlance "a new or improved let-off motion."

In Figure 1 we have represented an end view of the loom and our said invention and mechanism.

In the said drawings, A denotes the frame of the loom; B, the yarn beam or roller around which the warps are wound.

C is a pinion working into the yarn-beam gear D, and is fast to shaft E.

F is a friction-pulley, also fast to shaft E.

G is a sectional friction-piece, either made stationary to lever J or connected by a joint so as to yield, and holds a cork, leather, or other friction in contact with the pulley F by means of stud I, friction-lever J, and weight K.

H is a screw to lower or raise the friction-piece G when necessary.

I is a stud supporting the weighted or friction lever J.

K is a movable weight, which is hung to the sliding bar or piece marked 9, said bar or piece holding the pawls L.

N is a sliding or vibratory rack, jointed either direct to rod O or connected with the upper arm of an intermediate lever (marked 5) whose center is seen at 6, and which is supported by a branch from lever J. When the strain of warps or cloth acting through the cloth-roll and positive take-up ratchet, or mechanism (and hence on the equalizing-lever P) is used to drive or regulate the weight K, the rod O is connected direct to rack N. When the force of spring S is used for this purpose, the arm O is jointed to the lower arm of lever marked 5, and the upper arm of this lever 5 is jointed to the rack N; hence, when strain is made to drive the weight K, no use is made of lever 5. The arm O in the drawings is shown broken off from both of these connecting points, said arm O in either case being connected with the equalizing strain lever P.

R is a stationary pin attached to the loom-frame, inclosed by slot in arm of lever P, to arrest the action of said lever P at a certain point.

S is a gage or balance spring, acting as shown, serving to determine and regulate the desired strain.

T is a rod driven by crank U, hung on the cam-shaft V, said rod T driving the take-up lever W, and also carries a pin, X, to assist in driving or moving ahead, when necessary, the strain-lever P, as a means of acting on rack N when the gage-spring S is not sufficient to do it.

Y is the take-up ratchet and mechanism.

Z is the cloth-roll.

& is a roll that winds up the cloth.

A′ is a lever and finger coming from the protecting-rod to raise the strain-lever pawl out of the ratchet-gear Y when the filling breaks or runs out.

B′ is a stand that supports the friction-pulley F, shaft E, and pinion C.

C′ is the girt.

D′ is the whip-roll.

E′ is the breast-beam.

The cam-shaft V, by crank U, vibrates the rod T. This vibrates the positive take-up lever W, which, by its pawl, drives the take-up ratchet and mechanism Y and the cloth-roll Z.

F represents the equalizing gage strain-lever, hung loose on an independent stud, (said lever may be hung loose on the shaft of the positive take-up ratchet or cloth-roll,) its upper arm carrying a pawl Q, that works into or rests against the ratchet Y, while the lower arm acts against a spring, S, as shown in the drawings. Now, cloth of a given number of yarn and picks requires a certain uniform strain of the warps, when working in connection with the positive take-up mechanism, in order to insure uniformity of texture and true picks. We will suppose this amount of strain is equal to seven pounds for eighty-four picks of No. 40s filling, and that the drawings are representing this amount of strain and number of picks and filling. The equalizing-strain lever P, as intimated, is acted upon by a spring, S, as shown in the drawings, that just counterbalances this amount of strain. To the lower arm of lever P is jointed the rod O, said rod O being also jointed to the sliding or vibrating rack N. (In the drawings this rod O is shown broken off from this connecting point, for reasons already intimated.) We will suppose the take-up lever W and its pawl has a vibration sufficient to drive the ratchet Y one and three-fourths teeth (as represented between the dotted lines marked 3 and 4), or any distance less than two teeth, and that one tooth is all that is required to take up the two pecks for one revolution of the cam-shaft V. Now, when the take-up lever W and its pawl goes back to give another vibration, (it is represented in drawings as having made half-vibration,) the variable strain of the warps or cloth causes the ratchet Y to react to the extent of the three-fourths tooth, or what portion of this three-fourths tooth that may be required to vibrate the lever P, and by this movement to vibrate the rack N, so that by pawls L the weight K is moved on or along the friction-lever J in order to decrease the friction on pulley F, so that the desired strain may be balanced by the spring S again, as represented. The spring S is held stationary at one end, (passing through a stud marked 7, said stud being supported by the loom-frame,) and has a nut at 8 for adjusting, and is connected at the other end to a lip from rod O. Should the irregular strain of the warps or cloth, acting through the cloth-roll and positive take-up mechanism, at any time overbalance the power of the spring S, the rod T, with the pin X, is made to push (by the cam-shaft V) the lower arm of the lever P, and by this movement to drive the rod O and rack N, and through these means to drive or move the pawls L, sliding piece marked 9, and weight K on or along the friction-lever J. When the strain of the warps or cloth is at the proper or desired point, the spring S remains inactive, or nearly so, and the slot in the lever P brings up and rests against the stationary pin R, as shown in the drawings. It will be understood by reference that this spring S resists the action of the lever P to such a degree as to balance the desired strain, and works in unison with the movable weight K on the friction-lever J—that is to say, as the beam decreases in diameter and as the desired strain requires the variable strain of the warps or cloth acting through the cloth-roll and positive take-up mechanism, and on or through the strain-lever P, is made to move or graduate this weight K toward the fulcrum or center of the friction-lever J, in order always to keep or retain this desired strain uniform. Now, as the cloth is taken up the warps are unwound from the beam B by the same operation and by the beating up of the reed. If the warps were wound uniformly on the beam—the filling of the same number at all times—no contraction or stretch of the warps by variable temperature, &c., a regular increased rotary motion to the beam would only be necessary to insure true picks and uniform texture to the fabric; but the warps undergo this contraction and expansion, the filling is variable in its number, and the beam at some stages is wound soft or slack, while at other times it is harder or more compact in its wind. Hence, it is obvious that this regular increased rotary motion of the beam will not unwind and deliver the warps so as to give true or uniform picks or texture to the fabric. Therefore, if the variable strain of the warps or cloth is made a means to regulate or produce the desired strain, the positive take-up mechanism will take up or pull off the warps, so as to give true picks and uniform texture.

We do not claim priority in using "strain" as a means of regulation, for under various modifications it is found in use. For instance, Hendrick employs strain acting upon or with the movable reed as his regulating feature; also, Stone, Potter, and others, their motions acting in combination with an intermittent take-up motion. Knowles, Boyd, Bigelow, Mason, and others use one or more stationary or reacting vibratory whip-rolls as their point of regulation, while Taylor and Wilcox and others employ the beam as a means of regulation; but We do claim—

1. Employing the positive take-up mechanism or cloth-roll or any mechanism acted on or effected by the strain of the cloth when a positive take-up is used, as the point through which the variable strain and wind of warps is made to act more sensitively than from or by the variable vibratory reacting motion of the whip-rolls, or sudden jerking of the beam or movable reed.

2. Effecting and producing a regular delivery and uniform strain of the warps by the equalizing-strain lever P, or equivalent, said lever being acted upon by the variable strain of the warps or cloth through the positive take-up mechanism or cloth-roll, as represented.

3. The equalizing strain lever P, or analogous device, when operating in connection with the positive take-up mechanism or cloth-roll, or when effected by the strain of the cloth, in combination with any mechanism for producing rotary motion to the beam, and with any device or means for regulating the delivery and strain of the warps as the beam decreases in diameter and as the desired strain requires.

4. Employing the rod T with the pin X, or equivalent, to act upon the strain-lever P as a means of moving the weight K when the balance-spring S or equivalent device is not sufficient to move it.

5. In combination with the pulley F and pinion C, the movable weight K, the fixed or yielding sectional friction-piece G, and friction-lever J, as and for the purpose represented.

6. In combination with the weight K and friction-lever J, the rack N, or its equivalent, to so act upon weight K through catches L or analogous devices as to gradually move this weight K toward the fulcrum of lever J as the beam decreases in diameter and as the desired strain of warp requires.

7. In combination with the weight K and friction-lever J, or equivalent devices, the jointed or stationary sectional friction-piece G and set-screw H, as and for the purpose represented.

DANIEL W. SNELL.
STEPHEN S. BARTLETT.

Witnesses:
LIBERTY E. WELD,
BAILEY E. BORDEN.